Feb. 11, 1936.   N. W. WEBB   2,030,616
WIRE CLOTH SEAM AND METHOD OF MAKING SAME
Filed July 20, 1935   2 Sheets-Sheet 1

INVENTOR
Nelson W. Webb
BY
Prindle, Bean & Mann
ATTORNEYS

Feb. 11, 1936.  N. W. WEBB  2,030,616
WIRE CLOTH SEAM AND METHOD OF MAKING SAME
Filed July 20, 1935   2 Sheets-Sheet 2
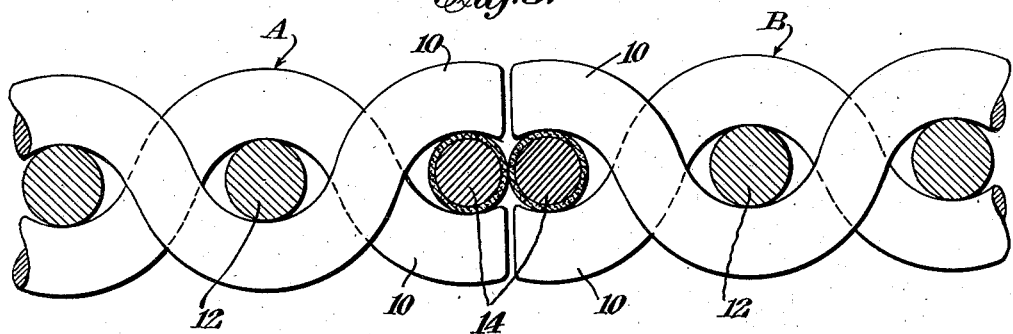
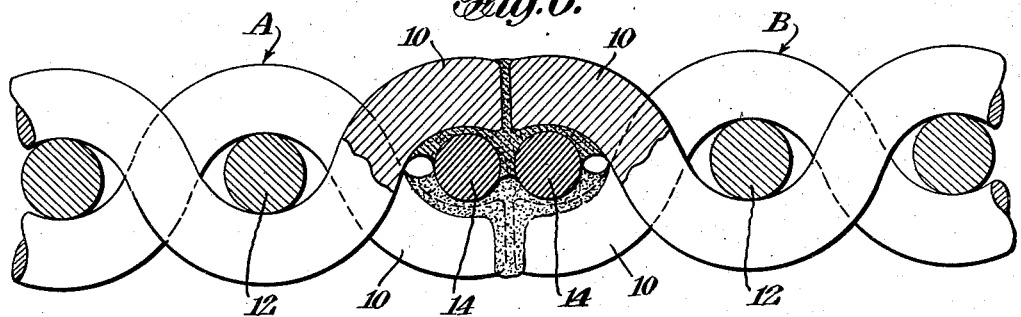
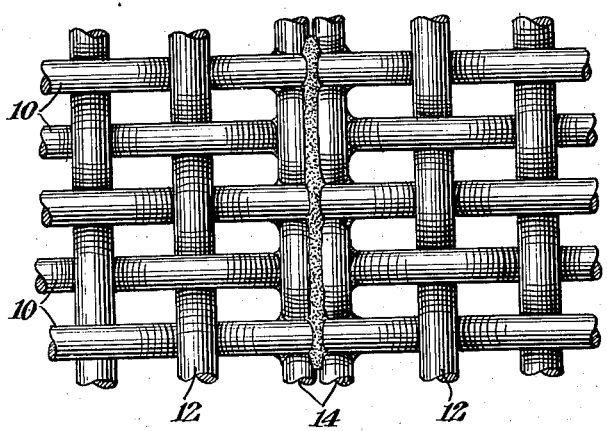
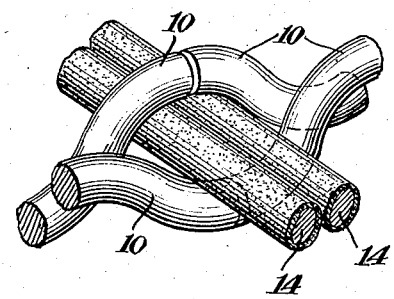
INVENTOR
*Nelson W. Webb*
BY
ATTORNEYS Patented Feb. 11, 1936

2,030,616

UNITED STATES PATENT OFFICE 2,030,616

WIRE-CLOTH SEAM AND METHOD OF MAKING SAME

Nelson W. Webb, Belleville, N. J., assignor to Eastwood-Nealley Corporation, Belleville, N. J., a corporation of New Jersey Application July 20, 1935, Serial No. 32,356

10 Claims. (Cl. 245—10)

My herein invention relates to improvements in wire-cloth seams and method of making same. The invention is adapted for example to joining the ends of wire-cloth to make the woven wire belts for paper making machines. The seam is readily made and is thoroughly practical when made in all necessary characteristics such as strength and flexibility and does not substantially vary the porosity of the belt.

The above and other objects and advantages of the invention will appear from the following description in connection with the drawings showing preferred embodiments of the invention, which are illustrative of the invention, but are not intended to limit it to all the details thereof, these being subject to change within the scope of the invention as defined by the appended claims.

In the drawings:

Figs. 5, 6, 7 and 8 show a modification, the views corresponding respectively to the aforesaid Figs. 1, 2, 3 and 4.

Similar reference characters indicate corresponding parts throughout the various figures of the drawings.

Figure 1:
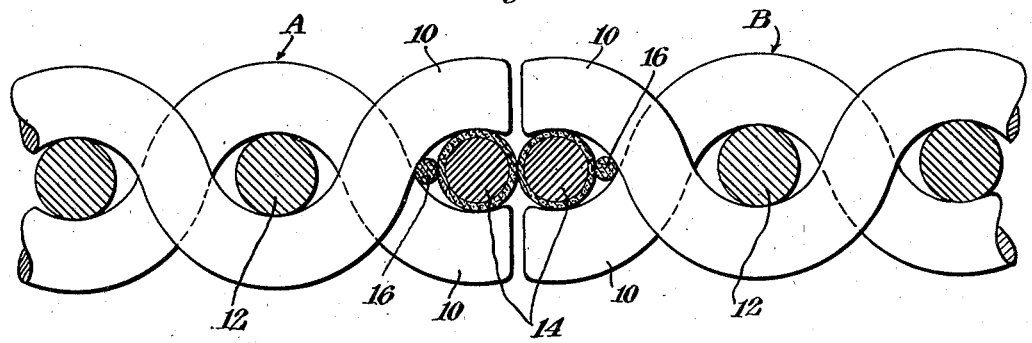
Fig. 1 is a vertical sectional view through the belt ends and other parts assembled to produce a seam in accordance with the invention before the soldering step has been applied.
Figure 4:
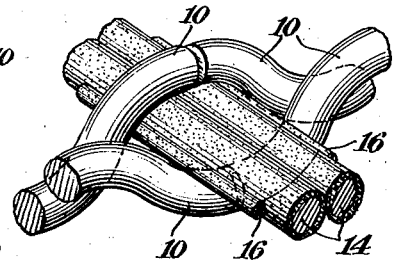
Fig. 4 is a perspective view of parts of Fig. 1 bearing the same reference characters.

Fig. 1 shows the wire-cloth ends A and B prepared for soldering them together edge to edge. The wire-cloth consists of interwoven wrap wires 10 and weft wires 12. The terminal weft wire of each cloth-end has been replaced by or consists of a solder-coated wire 14, the warp wires 10 being cutoff so that they extend beyond the axis of the solder-coated wire, but not beyond the far side of said wire. Preferably the far side of the solder-coated wire projects as shown beyond the cut-ends of the warps of the given cloth-end. Further, it will be noted in Fig. 1 that each solder-coated wire 14 is backed up by a smaller diameter wire 16. This is a length of solder-wire running parallel with the solder-coated wire 14 across the cloth-end in the position shown. It backs up and insures the referred to projection of one side of the solder-coated wire prior to the soldering step, and during said step furnishes additional solder to that supplied by the solder-coating of the wires 14. Fig. 4 is a fragmentary view of some of the assembled elements in perspective corresponding to Fig. 1.

Figure 2:
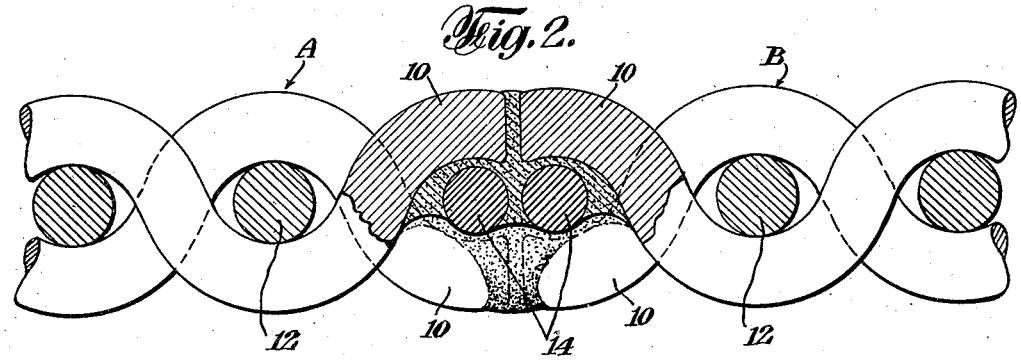
Fig. 2 is the seam after the soldering step.
Figure 3:
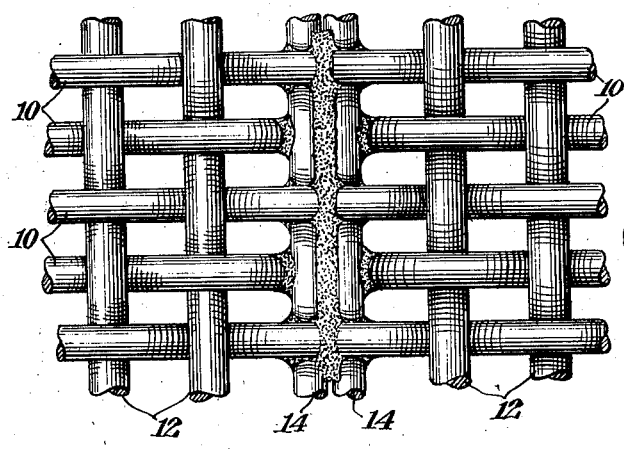
Fig. 3 is a plan view of a portion of the soldered seam and adjacent portions of the belt ends of Fig. 2.

Heat is then applied in any suitable or preferred manner either by hand or machine to solder the warps 10 to the solder-coated wires 14 and the latter side by side to each other to produce the seam shown in Figs. 2 and 3. This may be accomplished in one operation or the heat may be applied to one cloth-end at a time to solder-in its wire 14, after which the two ends may be assembled edge to edge and the heat reapplied to solder them together as shown in Figs. 2 and 3.

Before the soldering step, the warp wires 10 of the two cloth-ends are brought substantially into line as shown; and said warp wires may be either in end-on relationship as shown or if preferred may be in non-abutting relationship at the seam.

Figs. 2 and 3 show how the solder has also worked its way between the contiguous aligned ends of the warps in the particular form of the seam illustrated, thereby further strengthening and filling out the seam at those points across the resulting belt.

The warp and weft wires of the cloth and the cores of the solder-coated wires may be made of brass, bronze, Monel metal, stainless steel or other desirable or preferred materials. The solder coating of the wires 14 and the material of the small diameter wires 16 will ordinarily consist of silver-solder or a solder having the general characteristics of silver solder.

The solder-coated wires 14 preferably have the same original diameter as the original weft wires 12 of the cloth.

Another illustrative embodiment of the invention is shown in Figs. 5, 6, 7 and 8 and differs from the previously described embodiment substantially only in omitting the small diameter wires or strands of solder 16. In this embodiment, the solder is derived from the coatings of the wires 14 and is depended upon to solder and to integrate the seam.

The term soldering has been used herein for convenience but without any intention of excluding brazing or any other kind of heat produced metallic union between the assembled parts. Plain uncoated wires of bronze or the like may be substituted for the solder-coated wires 14 and the parts subjected to brazing treatment.

I have illustrated and described preferred and satisfactory embodiments of the invention but it will be understood that changes may be made within the spirit and scope thereof as defined in the appended claims.

What I claim is:

1. Method of joining wire cloth-ends which comprises preparing said cloth-ends for soldering them together edge to edge by replacing the last weft wire of each cloth-end with a solder-coated wire, the warp wires being cut off so that the side of its solder-coated wire projects beyond their cut ends, the latter extending beyond the axis of the solder-coated wire; and applying heat thereto to solder the warps to the solder-coated wires and the latter side by side to each other.

2. The method of claim 1 further characterized by the solder-coated wires having substantially the same diameter as the weft wires of the cloth.

3. The method of claim 1 further characterized by the warps of the two cloth-ends before the heating step being brought substantially into line and into end-on relationship.

4. The method of claim 1 further characterized by the warps of the two cloth-ends before the heating step being brought substantially into line and into end-on relationship, said heating step including soldering together end-on the aligned warps.

5. Method of claim 1 further characterized by backing up the solder-coated wires with smaller diameter solder wires placed parallel thereto.

6. Method of joining wire cloth-ends which comprises preparing said cloth ends for soldering them together edge to edge by replacing the last weft wire of each cloth-end with a solder-coated wire, the warp wires being cut off so that they extend beyond the axis of its solder-coated wire but not beyond the far side thereof; and applying heat thereto to solder the warps to the solder-coated wires and the latter side by side to each other.

7. A seam uniting wire cloth-ends, said cloth-ends having terminal weft wires located between the cut off free ends of the warp wires extending beyond the axis of the related weft wire but not beyond the far side thereof, said free ends of the warp wires being soldered to said weft wires and the weft wires being soldered side by side to each other.

8. The seam of claim 7 further characterized by the free ends of the warp wires of one cloth-end being located in end-on alinement with the free ends of the warp wires of the other cloth-end.

9. The seam of claim 7 further characterized by the free ends of the warp wires of one cloth-end being located in solder-united end-on alinement with the free ends of the warp wires of the other cloth-end.

10. The method of joining wire cloth-ends which comprises preparing said cloth-ends for soldering them together edge to edge, the warp wires of the respective ends being cut off so that they project beyond the axis of the related terminal weft wire but not beyond the far side thereof; and soldering said free end portions of the warps to the related terminal weft wires and the latter side by side to each other.

NELSON W. WEBB.